Patented Jan. 4, 1949

2,458,286

UNITED STATES PATENT OFFICE 2,458,286

PHOSPHORESCENT PIGMENT

Neville F. Miller, Palmerton, Pa., assignor to The New Jersey Zinc Company, New York, N. Y., a corporation of New Jersey No Drawing. Application October 11, 1947, Serial No. 779,407

7 Claims. (Cl. 252—301.4)

This invention relates to phosphorescent pigments, especially of the alkaline earth metal sulphide type, and has for its object the provision of an improved alkaline earth metal sulphide phosphorescent pigment and particularly an improved calcium sulphide-strontium sulphide phosphorescent pigment.

The phosphorescent properties of pigments of the alkaline earth metals, particularly when appropriately activated, have long been recognized. For example, phosphors of calcium sulphide and strontium sulphide, and mixtures thereof, have heretofore been commonly activated by bismuth. I have discovered that the phosphorescence of such phosphors is greatly improved by the inclusion of lead as a second or auxiliary activator. The present invention, based on that discovery, involves an improved phosphorescent pigment of the alkaline earth metal sulphide type containing as activators minute amounts of both bismuth and lead.

The activation of the alkaline earth metal sulphide is commonly effected by muffling or otherwise suitably heat treating at elevated temperature a mixture of the sulphide, or a plurality of the sulphides, and a minute amount of the activator in the form of a salt, such for example as bismuth nitrate. While it is customary to refer to the activator in the resulting phosphorescent pigment as "bismuth," it will be understood that the bismuth is not present in the metallic form but as a compound of bismuth resulting from the decomposition at elevated temperature of the bismuth salt in the presence of the alkaline earth metal sulphide or sulphides and any flux, sulphur or reducing agent that may be mixed therewith.

The improved phosphorescent pigment of the invention is similarly made by heat treating at elevated temperature a mixture comprising an alkaline earth metal sulphide either as a single sulphide or as a plurality of such sulphides, and containing as activators minute amounts of both a bismuth salt and a lead salt. In addition to the activators small amounts of fluxes, such for example as one or more alkali metal salts, sulphur and a reducing agent may be included in the mixture. The heat treatment is carried out in a nonoxidizing and preferably inert or slightly reducing atmosphere such, for example, as sulphur vapor from the added sulphur or carbon monoxide from the added reducing agent, and may be advantageously conducted in a retort or muffle externally heated to impart a temperature of 900 to 1300° C. to the mixture. At the lower end of this muffling temperature range a relatively long heating period is required, and, conversely, at the upper end of the temperature range the heating period must be relatively short and must be carried out with care to prevent damage to the pigment. In general, muffling temperatures within the range of 1000 to 1200° C. give particularly effective results. The heat treatment is continued for one to two hours, which is generally sufficient to effect the necessary diffusion of the activator throughout the pigment, and the resulting mixture is allowed to cool under nonoxidizing conditions, and is then carefully ground. The grinding should be relatively gentle in order to avoid destroying the phosphorescence by crushing.

Although the phosphorescent pigment of the invention may comprise a single alkaline earth metal sulphide, such as calcium sulphide or strontium sulphide, it is preferably composed for the most part of calcium sulphide and strontium sulphide in ratios varying from 80:20 to 20:80. Only a minute amount of each activator is included in the pigment, usually a few hundredths or less of one per cent of bismuth and a few thousandths or less of one per cent of lead by weight being sufficient. For practical reasons it is more convenient and more accurate to express the minute amount of the two activators included in the finished pigment in terms of the amount admixed with the raw alkaline earth metal sulphide or sulphides prior to heat treatment. Expressed thus in weight per cent based on the total weight of alkaline earth metal sulphide or sulphides in the mixture prepared for heat treatment, the optimum and useful ranges of the two activators are as follows:

|  | Optimum range | Useful range |
| --- | --- | --- |
| Lead (calculated as Pb) | 0.0011–0.0016 | 0.00055–0.0032 |
| Bismuth (calculated as Bi) | 0.017–0.030 | 0.0043–0.043 |

Throughout the entire range of 0.0043–0.043% added bismuth, as little as 0.00055% added lead is effective in synergistically decreasing the rate of phosphorescent decay in accordance with the invention. Increasing amounts of lead up to 0.0032% are also effective throughout the aforementioned range of bismuth content. Lead contents materially above 0.0032% tend to lose their effectiveness and even increase the rate of phosphorescent decay of the bismuth-activated pigment. For example, the addition of 0.010% lead to an 80/20 calcium sulphide-strontium sulphide pigment containing 0.021% bismuth causes throughout a decay period of 60 minutes a consistent decrease of over 80% in the phosphorescent brightness of the same pigment activated with the same amount of bismuth alone.

Because of the difficulty of uniformly distributing the minute amounts of bismuth and lead salts throughout the pigment mixture, these salts are advantageously those capable of being dissolved in a volatile solvent which has no adverse effect upon the composition of the mixture. Thus, bismuth nitrate, bismuth subnitrate (to which bismuth nitrate largely hydrolyzes in water), bismuth chloride and bismuth citrate may be used as the bismuth compound, and lead chloride and lead acetate are examples of suitable lead compounds. The degree of solubility of these compounds in a solvent need not be great because of the minute amounts of these compounds which are effective in the practice of the invention. The inclusion of fluxes in the mixture prepared for heat treatment is helpful in introducing the activators into the pigment crystals during the heat treatment. Among suitable fluxes for the purpose are alkali metal salts such as, for example, sodium fluoride, sodium carbonate and lithium sulphate. The amount of flux included in the mixture is relatively small, being generally about 1-2% by weight based on the weight of the mixture. Elemental sulphur, say about 5% by weight, and magnesium oxide, also around 5% by weight, may also be advantageously included in the mixture. Sulphur stabilizes the sulphide pigments and also protects the mixture from oxidation during the heat treatment, and magnesium oxide inhibits any tendency of the mixture to fuse or sinter. In addition, the mixture may advantageously include a reducing agent readily decomposable by heat, such as starch, which insures the presence of a non-oxidizing and even a somewhat reducing atmosphere during the heat treatment.

The compositions of two typical phosphors of the invention are given below, the various constituents being expressed in terms of the amounts included in the mixture prepared for heat treatment. The constituents were thoroughly mixed in a wooden vat provided with a stainless steel spiral ribbon mixer. Because of their minute amounts, the activators are conveniently added by spraying onto the mixture a solution of their respective salts in water, alcohol or other suitable solvent. The mixtures were muffled at a temperature of about 1075° C. for 40 to 60 minutes, then ground and remuffled at about the same temperature for about the same time, and carefully ground.

|  | 70/30 CaS/SrS Phosphor | 50/50 CaS/SrS Phosphor |
| --- | --- | --- |
|  | Parts by weight | Parts by weight |
| Bismuth Nitrate .5H$_2$O | 0.065 | 0.040 |
| Lead Acetate .3H$_2$O | 0.003 | 0.003 |
| Sodium Fluoride | 1.0 | None |
| Sodium Carbonate (Anhydrous) | None | 6.2 |
| Lithium Sulphate (Anhydrous) | 1.0 | 3.1 |
| Calcium Sulphide | 70.0 | 50.0 |
| Strontium Sulphide | 30.0 | 50.0 |
| Magnesium Oxide | 4.7 | 4.7 |
| Starch | 5.0 | 5.0 |
| Sulphur | 5.0 | 5.0 |

The composition of mixtures of ingredients used to produce a pigment containing calcium sulphide without any strontium sulphide and another pigment containing strontium sulphide without any calcium sulphide are as follows, the pigments being prepared and treated in the same manner as those previously described:

|  | 100/0 CaS/SrS Phosphor | 0/100 CaS/SrS Phosphor |
| --- | --- | --- |
|  | Parts by weight | Parts by weight |
| Bismuth Subnitrate BiONO$_3$.H$_2$O | 0.0088 | 0.0050 |
| Lead Acetate .3H$_2$O | 0.0006 | 0.0004 |
| Lithium Sulphate (Anhydrous) | 0.36 | 0.62 |
| Sodium Carbonate (Anhydrous) | 0.72 | 1.24 |
| Calcium Sulphide | 20.0 | None |
| Strontium Sulphide | None | 20.0 |
| Magnesium Oxide | 0.80 | 0.94 |
| Starch | 0.88 | 1.00 |
| Sulphur | 1.78 | 1.00 |

In the foregoing compositions, the calcium sulphide and strontium sulphide were added as such. However, the contemplated mixture of the two sulphides may be formed in situ by calcining mixtures of calcium oxide and strontium carbonate with sufficient sulphur to sulphidize these compounds. During this calcining the calcium and strontium compounds are transformed into the corresponding sulphides with the result that during an effective portion of the calcining period the mixture comprises calcium sulphide and strontium sulphide and contains the bismuth and lead salts. The raw materials (parts by weight) for preparing a phosphorescent pigment of the invention in this manner are as follows:

Bismuth nitrate 5H$_2$O _____ 0.04
Lead acetate.3H$_2$O _____ 0.003
Sodium carbonate _____ 6.2
Lithium sulphate _____ 3.1
Calcium carbonate _____ 97.2
Strontium carbonate _____ 37.0
Magnesia _____ 4.7
Starch _____ 13.0
Sulphur _____ 35.0

The calcium carbonate is calcined alone at a temperature of about 1000° C. for about 1 hour to convert it to a calcium oxide. The 97.2 parts by weight of calcium carbonate is chemically equivalent to 54.3 parts of calcium oxide and 70 parts of calcium sulphide. The calcium oxide is then mixed with the other materials, the 37.0 parts of strontium carbonate being chemically equivalent to 30 parts of strontium sulphide. The mixture is then muffled twice at a temperature of about 1075° C., as hereinbefore described. Of course, the same procedure may be used to prepare a pigment containing only a single alkaline earth metal sulphide.

Calcium sulphide and strontium sulphide for making the pigment of the invention may be prepared in any suitable manner. Thus, strontium sulphide may be prepared by reducing celestite (native strontium sulphate) with carbon in an internally fired rotary kiln, leaching the cooled residue with water and crystallizing strontium sulphide from the leach liquor. A useful calcium sulphide may be obtained from the lime water used to absorb hydrogen sulphide from exhaust gases containing the same. Such lime water is converted into calcium sulfhydrate liquor from which calcium sulphide can be obtained by evaporation. Such calcium sulphide will contain calcium oxide, calcium sulphate and calcium thiosulphate in variable amounts, but it is a useful material in preparing pigments of the invention.

It is generally desirable to carry out the heat treatment of the crude pigment mixture in two steps. Thus, the heat treatment may be carried out in small muffles consisting of silica tubes, each containing about 12 pounds of the crude mixture. These muffles are set horizontally in refractory holding tubes heated in a furnace at about 1075° C. It is advantageous to push the muffle slowly into the furnace, taking say 10 minutes for this operation, and to remove it slowly say in about 10 minutes. After removal from the furnace, the tube is allowed to cool for an hour or more. Then the contents are discharged into a ball mill filled with flint pebbles and ground for a short time, say 5 or 10 minutes, about 1.5% sulphur being added before milling. The added sulphur protects the charge from oxidation during the second heat treatment, which is carried out like the first. The temperature of the second heat treatment may, however, in some cases be somewhat lower, say 975° C.

It will be understood that variations in the heat treatment operation may be made according to circumstances.

The phosphorescent pigments of the invention display substantially greater and more prolonged phosphorescence than corresponding pigments of the prior art. They are generally cream colored, and display a blue phosphorescence. The following table compares the phosphorescent brightness (in microlamberts) of calcium sulphide, strontium sulphide, and calcium sulphide-strontium sulphide phosphors of the invention (A) with phosphors of corresponding composition but without lead as auxiliary activator (B). The phosphors prepared without lead as auxiliary activator are representative of the prior art. The pigments, each incorporated in the same nitrocellulose lacquer and applied to panels for test purposes, were excited to phosphorescence by exposure for one minute to 600 foot candle illumination from a Mazda lamp. Infrared light was filtered from illumination by a water cell interposed between the lamp and the pigment.

|  | A | B | Percent improvement in phosphorescent brightness |
|---|---|---|---|
| 1. CaS/SrS ratio 100/0: | | | |
| Per cent Bi | 0.030 | 0.030 | |
| Per cent Pb | 0.0016 | None | |
| Time After Excitation: | | | |
| 1 Minute | 20 | 21 | −5 |
| 30 Minutes | 1.05 | .65 | +62 |
| 1 Hour | .49 | .29 | +69 |
| 3 Hours | .14 | .076 | +84 |
| 8 Hours | .043 | .024 | +79 |
| 2. CaS/SrS ratio 80/20: | | | |
| Per cent Bi | 0.028 | 0.028 | |
| Per cent Pb | 0.0016 | None | |
| Time After Excitation: | | | |
| 1 Minute | 37 | 38 | −2.6 |
| 30 Minutes | 3.8 | 1.45 | +93 |
| 1 Hour | 1.30 | 0.65 | +100 |
| 3 Hours | 0.54 | 0.29 | +86 |
| 8 Hours | 0.23 | 0.10 | +130 |
| 3. CaS/SrS ratio 60/40: | | | |
| Per cent Bi | 0.028 | 0.028 | |
| Per cent Pb | 0.0016 | None | |
| Time After Excitation: | | | |
| 1 Minute | 56 | 50 | +12 |
| 30 Minutes | 4.0 | 1.9 | +110 |
| 1 Hour | 1.6 | 0.78 | +105 |
| 3 Hours | 0.59 | 0.29 | +103 |
| 8 Hours | 0.24 | 0.13 | +85 |
| 4. CaS/SrS ratio 70/30: | | | |
| Per cent Bi | 0.028 | 0.028 | |
| Per cent Pb | 0.0016 | None | |
| Time After Excitation: | | | |
| 1 Minute | 47 | 38 | +23 |
| 30 Minutes | 3.8 | 1.9 | +100 |
| 1 Hour | 2.0 | 0.70 | +186 |
| 3 Hours | 0.70 | 0.30 | +133 |
| 8 Hours | 0.30 | 0.14 | +114 |
| 5. CaS/SrS ratio 50/50: | | | |
| Per cent Bi | 0.028 | 0.028 | |
| Per cent Pb | 0.0016 | None | |
| Time After Excitation: | | | |
| 1 Minute | 56 | 48 | +17 |
| 30 Minutes | 4.6 | 1.8 | +155 |
| 1 Hour | 2.0 | 0.70 | +186 |
| 3 Hours | 0.66 | 0.24 | +175 |
| 8 Hours | 0.24 | 0.11 | +118 |
| 6. CaS/SrS ratio 70/30 (made with highly purified carbonates): | | | |
| Per cent Bi | 0.017 | 0.017 | |
| Per cent Pb | 0.0016 | None | |
| Time After Excitation: | | | |
| 1 Minute | 35 | 31 | +13 |
| 30 Minutes | 3.9 | 1.3 | +200 |
| 1 Hour | 2.1 | 0.71 | +196 |
| 3 Hours | 0.70 | 0.26 | +169 |
| 8 Hours | 0.27 | 0.11 | +145 |
| 7. CaS/SrS ratio 50/50: | | | |
| Per cent Bi | 0.017 | 0.028 | |
| Per cent Pb | 0.0016 | None | |
| Time After Excitation: | | | |
| 1 Minute | 52 | 48 | +8 |
| 30 Minutes | 6.2 | 1.8 | +240 |
| 1 Hour | 3.0 | 0.70 | +330 |
| 3 Hours | 1.03 | 0.24 | +330 |
| 8 Hours | 0.43 | 0.11 | +300 |
| 8. CaS/SrS ratio 20/80: | | | |
| Per cent Bi | 0.017 | 0.017 | |
| Per cent Pb | 0.0011 | None | |
| Time After Excitation: | | | |
| 1 Minute | 63 | 56 | +13 |
| 30 Minutes | 4.3 | 1.9 | +126 |
| 1 Hour | 2.1 | 0.81 | +159 |
| 3 Hours | 0.70 | 0.22 | +218 |
| 8 Hours | 0.25 | 0.05 | +400 |
| 9. CaS/SrS ratio 0/100: | | | |
| Per cent Bi | .017 | .017 | |
| Per cent Pb | .0011 | None | |
| Time After Excitation: | | | |
| 1 Minute | 86 | 37 | +132 |
| 30 Minutes | 1.63 | .37 | +341 |
| 1 Hour | .64 | .126 | +408 |
| 3 Hours | .14 | .024 | +483 |
| 8 Hours | .035 | .0054 | +548 |

It will be seen from the foregoing table that throughout the full range of combinations of calcium sulphide and strontium sulphide, from calcium sulphide alone to strontium sulphide alone, the presence of both lead and bismuth as activators is superior to bismuth as a single activator. The improvement effected by the combined use of lead and bismuth as activators is particularly pronounced with mixtures of calcium sulphide and strontium sulphide in ratios varying from 80:20 to 20:80. It is interesting to note that pigment 7, containing 0.017% Bi and 0.0016% Pb, shows a marked increase in phosphorescent brightness over the corresponding prior art pigment which contained about 65% more bismuth (0.028%) and no lead. The double activation of calcium sulphide and strontium sulphide, and mixtures thereof, is not due merely to the additive effects of the two individual activators.

It will be noted that the percentage improvement in phosphorescent brightness of the pigments of the invention is most noticeable several hours after excitation. This is particularly advantageous since it means that pigments of the invention retain better luminosity over an eight hour period than do prior art pigments. The uses to which phosphorescent pigments are customarily put involve excitation during the hours of daylight, and luminosity is desired throughout the following hours of night. The pigments of the invention retain effective over-night luminosity.

This application is a continuation in part of my copending application Serial No. 593,089, filed May 10, 1945, now abandoned.

I claim:

1. A phosphorescent pigment comprising the product of heat treating at 900° to 1300° C. a mixture consisting essentially of an alkaline earth metal sulphide of the group consisting of calcium sulphide and strontium sulphide and containing minute amounts of a bismuth salt and a lead salt such as to comprise about 0.0043–0.043% bismuth and 0.00055–0.0032% lead by weight of the sulphide, said heating being continued for a sufficient period of time to effect diffusion of the bismuth and lead throughout the pigment.

2. A phosphorescent pigment comprising the product of heat treating at 900° to 1300° C. a mixture consisting essentially of an alkaline earth metal sulphide of the group consisting of calcium sulphide and strontium sulphide and containing minute amounts of a bismuth salt and a lead salt such as to comprise about 0.017–0.030% bismuth and 0.0011–0.0016% lead by weight of the sulphide, said heating being continued for a sufficient period of time to effect diffusion of the bismuth and lead throughout the pigment.

3. A phosphorescent pigment comprising the product of heat treating at 900° to 1300° C. a mixture consisting essentially of calcium sulphide and containing minute amounts of a bismuth salt and a lead salt such as to comprise about 0.0043–0.043% bismuth and 0.00055–0.0032% lead by weight of the sulphide, said heating being continued for a sufficient period of time to effect diffusion of the bismuth and lead throughout the pigment.

4. A phosphorescent pigment comprising the product of heat treating at 900° to 1300° C. a mixture consisting essentially of strontium sulphide and containing minute amounts of a bismuth salt and a lead salt such as to comprise about 0.0043–0.043% bismuth and 0.00055–0.0032% lead by weight of the sulphide, said heating being continued for a sufficient period of time to effect diffusion of the bismuth and lead throughout the pigment.

5. A phosphorescent pigment comprising the product of heat treating at 900° to 1300° C. a mixture consisting essentially of calcium sulphide and strontium sulphide in ratios varying from 80:20 to 20:80 and containing minute amounts of a bismuth salt and a lead salt such as to comprise about 0.0043–0.043% bismuth and 0.00055–0.0032% lead by weight of the sulphide, said heating being continued for a sufficient period of time to effect diffusion of the bismuth and lead throughout the pigment.

6. A phosphorescent pigment comprising the product of heat treating at 900° to 1300° C. a mixture consisting essentially of calcium sulphide and strontium sulphide in ratios varying from 80:20 to 20:80 and containing minute amounts of a bismuth salt and a lead salt such as to comprise about 0.017–0.030% bismuth and 0.0011–0.0016% lead by weight of the sulphide, said heating being continued for a sufficient period of time to effect diffusion of the bismuth and lead throughout the pigment.

7. A phosphorescent pigment comprising the product of heat treating at 900° to 1300° C. a mixture consisting essentially of an alkaline earth metal sulphide of the group consisting of calcium sulphide and strontium sulphide and containing a bismuth salt, a lead salt, a flux comprising about 1–2% by weight of an alkaline metal salt, and about 5% by weight of sulphur, the amount of said bismuth salt and lead salt being such as to comprise about 0.0043–0.043% bismuth and 0.00055–0.0032% lead by weight of the sulphide, said heating being continued for a sufficient period of time to effect diffusion of the bismuth and lead throughout the pigment.

NEVILLE F. MILLER.

REFERENCES CITED

The following references are of record in the file of this patent:

UNITED STATES PATENTS

| Number | Name | Date |
|---|---|---|
| 2,074,226 | Kunz | Mar. 16, 1937 |

OTHER REFERENCES

Lenard: "Handbuch der Experimental Physik," vol. XXIII, part 1, pages 342, 345, 373 and 375.